United States Patent
Liang et al.

(10) Patent No.: US 11,080,281 B2
(45) Date of Patent: Aug. 3, 2021

(54) GRAPH-BASED SEARCHING FOR DATA STREAM

(71) Applicant: INTERNATIONAL BUSINESS MACHINES CORPORATION, Armonk, NY (US)

(72) Inventors: Xiao Xing Liang, Beijing (CN); Cheng Luo, Beijing (CN); Wayne B. Riley, Cary, NC (US); Shaw-Ben Shi, Austin, TX (US); Meng Hong Tsai, Taipei (TW); Qingyan Wang, Sudbury, MA (US); Yu Ling Zheng, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 16/415,394

(22) Filed: May 17, 2019

(65) Prior Publication Data

US 2019/0272273 A1    Sep. 5, 2019

Related U.S. Application Data

(63) Continuation of application No. 15/790,506, filed on Oct. 23, 2017, now Pat. No. 10,901,999.

(51) Int. Cl.
*G06F 16/20* (2019.01)
*G06F 16/2455* (2019.01)
*G06F 16/901* (2019.01)
*H04L 29/08* (2006.01)

(52) U.S. Cl.
CPC .... *G06F 16/24568* (2019.01); *G06F 16/9024* (2019.01); *H04L 67/10* (2013.01)

(58) Field of Classification Search
None
See application file for complete search history.

(56) References Cited

U.S. PATENT DOCUMENTS

| 7,548,937 | B2 | 6/2009 | Gu |
| 7,949,683 | B2 | 5/2011 | Goyal |
| 8,185,352 | B2 | 5/2012 | Anderson |
| 8,572,127 | B2 | 10/2013 | Chowdhury |

(Continued)

OTHER PUBLICATIONS

List of IBM Patents or Patent Applications Treated as Related. Filed May 17, 2019. 2 pages.

(Continued)

*Primary Examiner* — Belix M Ortiz Ditren
(74) *Attorney, Agent, or Firm* — Michael A. Petrocelli

(57) ABSTRACT

A method, system, and computer program product for graph-based searching for one or more data streams is disclosed. A computer-implemented method comprises extracting a plurality of tuples from one or more data streams. The method further comprises generating a graph for the plurality of tuples in which a node represents a tuple of the plurality of tuples and an edge represents a correlation between the node and another node, and the edge is generated based at least partly on one or more predetermined queries for the one or more data streams. The method further comprises traversing the graph based on the one or more predetermined queries. Accordingly, embodiments of the present disclosure can improve the search speed by use of the graph-based searching for one or more data streams.

5 Claims, 12 Drawing Sheets

(56) References Cited

U.S. PATENT DOCUMENTS

| | | |
|---|---|---|
| 8,909,569 B2 | 12/2014 | Spivack |
| 8,949,810 B2 | 2/2015 | Andrade |
| 9,424,312 B2 | 8/2016 | Imaki |
| 2008/0065644 A1 | 3/2008 | Pasupuleti |
| 2012/0158790 A1 | 6/2012 | Chowdhury |
| 2012/0317094 A1* | 12/2012 | Bear ................. G06F 16/24542 707/714 |
| 2014/0324900 A1* | 10/2014 | Hussain ............. H04L 63/1441 707/758 |
| 2016/0179883 A1 | 6/2016 | Chen |
| 2018/0189350 A1* | 7/2018 | Imaki ................ G06F 16/24568 |
| 2019/0121895 A1 | 4/2019 | Liang |

OTHER PUBLICATIONS

Mell et al., "The NIST Definition of Cloud Computing", National Institute of Standards and Technology, Special Publication 800-145, Sep. 2011, 7 pages.

Pan et al., "CGStream: Continuous Correlated Graph Query for Data Streams", CIKM'12, Oct. 29-Nov. 2, 2012, pp. 1183-1192.

Yabo Xu et al., "Classification Spanning Correlated Data Streams", CIKM'06, Nov. 5-11, 2006, pp. 1-10.

Yabo Xu, et al., "Classification Spanning Correlated Data Streams", CIKM'06, Nov. 5-11, 2006, 10 pages.

* cited by examiner

GRAPH-BASED SEARCHING FOR DATA STREAM

BACKGROUND

Embodiments of the present disclosure relate generally to information searching, and more specifically, to graph-based searching for one or more data streams.

A data stream is a sequence of digitally encoded coherent signals (such as data packets) used to transmit or receive information that is in the process of being transmitted, and the data stream is generally continuous and uninterrupted. Generally, in a scenario of Internet of Things (IoT), there are many types of sensors to monitor an object or an environment from different dimensions. For example, a first sensor is used to collect a temperature data stream of a house which has several rooms, a second sensor is used to collect a humidity data stream of the house, and a third sensor is used to collect an air quality index (AQI) data stream of the house.

Generally, data streams collected from different sensors need to be processed for data analysis, and the data analysis may focus on more than one dimension. For example, these data streams may be analyzed in real time to obtain an accurate result from multi-dimensions. To perform the data analysis, data from these different data streams need to be correlated or linked together via a common attribution such as an identification (ID) of a room. That is, searching the correlated data from different data streams is a basis of the subsequent data analysis for these data streams.

SUMMARY

Example embodiments of the present disclosure provide a new approach for graph-based searching for one or more data streams.

In an aspect, a computer-implemented method is provided. The method comprises extracting a plurality of tuples from one or more data streams. The method further comprises generating a graph for the plurality of tuples in which a node represents a tuple of the plurality of tuples and an edge represents a correlation between the node and another node, and the edge is generated based at least partly on one or more predetermined queries for the one or more data streams. The method further comprises traversing the graph based on the one or more predetermined queries.

In another aspect, a computing system is provided. The computing system comprises one or more processors, a memory coupled to at least one of the processors, and a set of computer program instructions stored in the memory and executed by at least one of the processors in order to perform actions of including extracting a plurality of tuples from one or more data streams. The actions further include generating a graph for the plurality of tuples in which a node represents a tuple of the plurality of tuples and an edge represents a correlation between the node and another node, and the edge is generated based at least partly on one or more predetermined queries for the one or more data streams. The actions further include traversing the graph based on the one or more predetermined queries.

In yet another aspect, a computer program product for graph-based searching is provided. The computer program product comprises a computer readable storage medium having program instructions embodied therewith, and the program instructions are executable by a device to cause the device to perform a method comprising: extracting a plurality of tuples from one or more data streams; and generating a graph for the plurality of tuples in which a node represents a tuple of the plurality of tuples and an edge represents a correlation between the node and another node, wherein the edge is generated based at least partly on one or more predetermined queries for the one or more data streams. The method further comprises traversing the graph based on the one or more predetermined queries.

According to embodiments of the present disclosure, the search speed for one or more data streams can be improved by use of the graph-based searching for the one or more data streams. That is, the correlation searching for the one or more data streams may be transformed into a traversing process in a graph. Moreover, the edges in the graph may be reused during the traversing of the graph, which can reduce computing and memory consumption significantly. Since the nodes in the graph may be traversed individually, embodiments of the present disclosure can be implemented in a distributed environment, and the traversing actions at different nodes may be performed in parallel and asynchronously. Furthermore, embodiments of the present disclosure provide a detailed way to generate a graph for the data streams and traverse the graph, by which both the search speed and the search accuracy can be ensured.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, the same or similar reference numerals represent the same or similar elements.

DETAILED DESCRIPTION

Figure 1A:
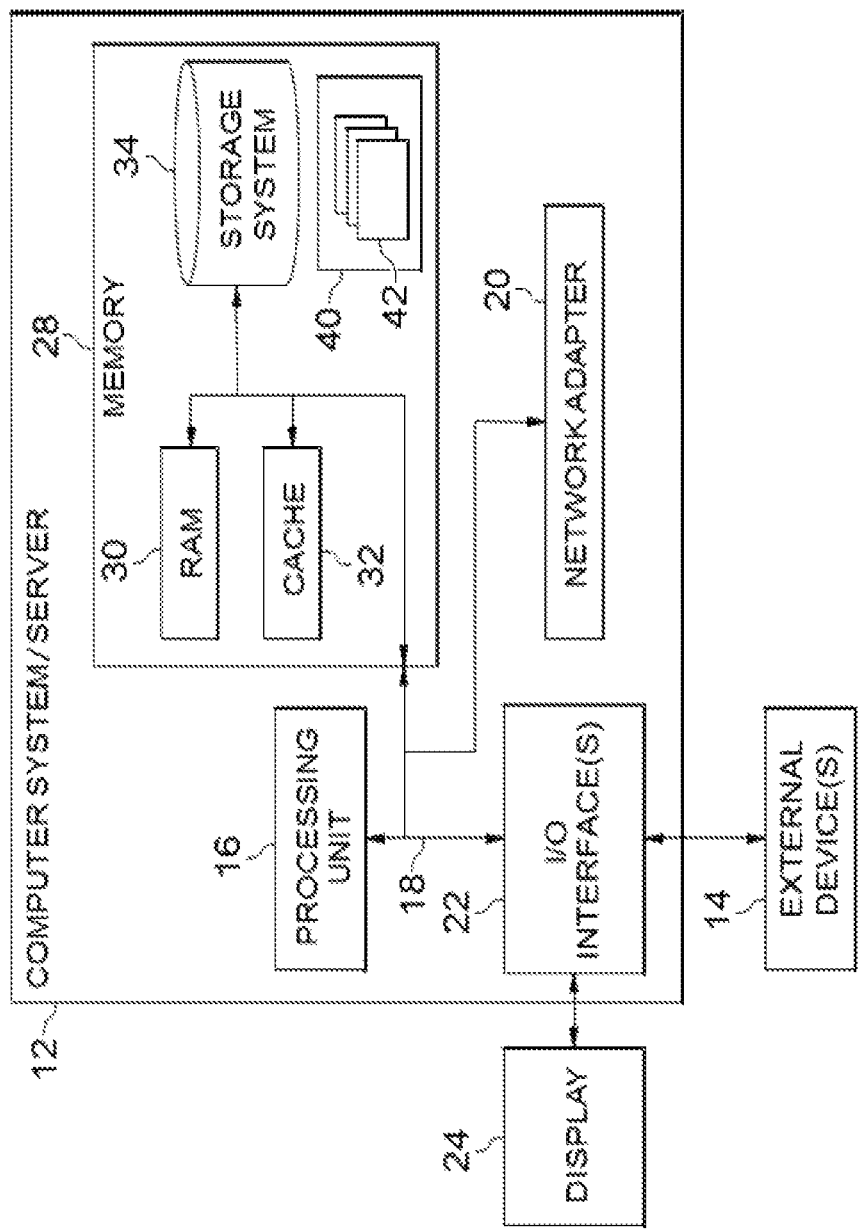
FIG. 1A depicts a cloud computing node according to an embodiment of the present disclosure.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "a" is to be read as "one or more" unless otherwise specified. The term "based on" is to be read as "based at least in part on." The term "one embodiment" and "an embodiment" are to be read as "at least one embodiment." The term "another embodiment" is to be read as "at least one other embodiment."

In some examples, values, procedures, or apparatus are referred to as "lowest", "best," "minimum," or the like. It will be appreciated that such descriptions are intended to indicate that a selection among many used functional alternatives can be made, and such selections need not be better, smaller, or otherwise preferable to other selections.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1A, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
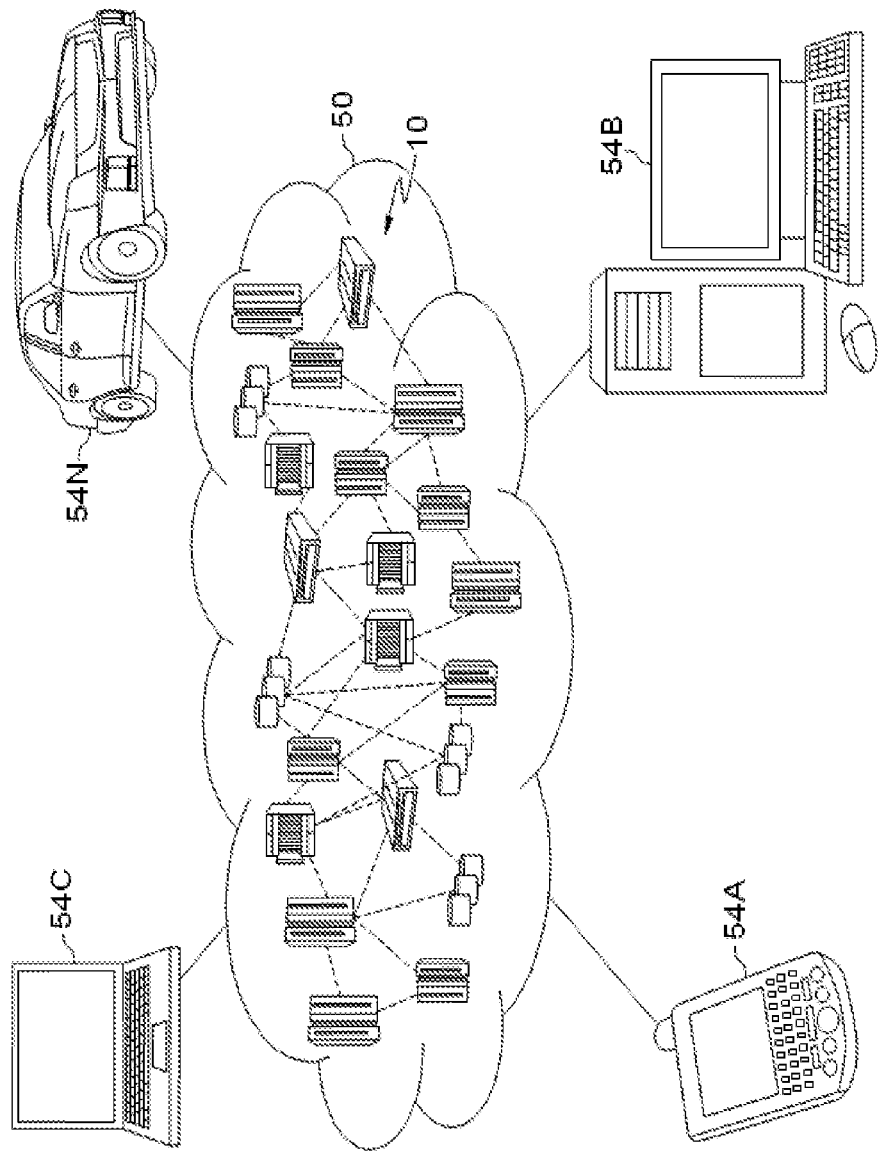
FIG. 1B depicts a cloud computing environment according to an embodiment of the present disclosure.

Referring now to FIG. 1B, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1B are intended to be illustrative only and that computing nodes 10 and cloud computing environment 50 can communicate with any type of computerized device over any type of network and/or network addressable connection (e.g., using a web browser).

Figure 1C:
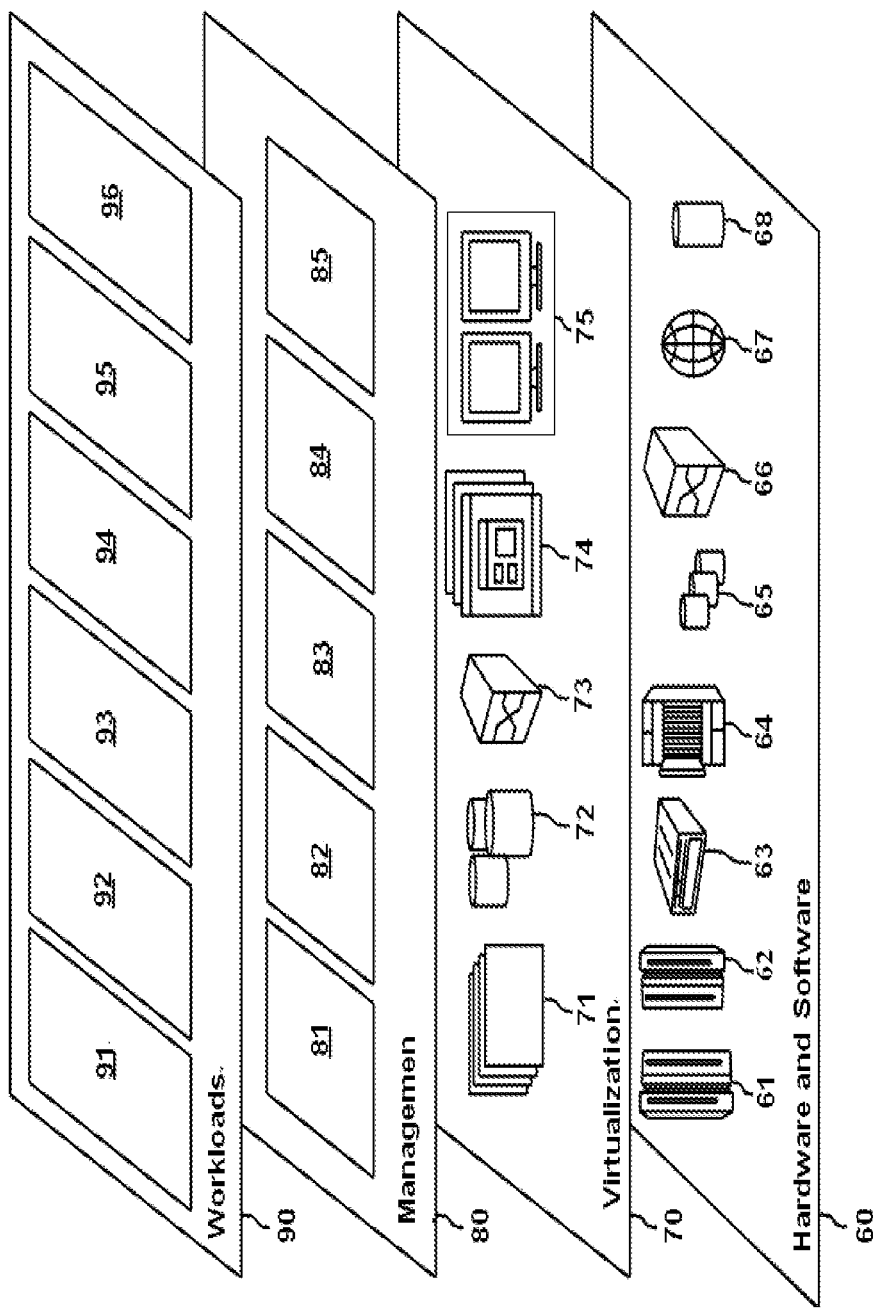
FIG. 1C depicts abstraction model layers according to an embodiment of the present disclosure.

Referring now to FIG. 1C, a set of functional abstraction layers provided by cloud computing environment 50 (FIG. 1B) is shown. It should be understood in advance that the components, layers, and functions shown in FIG. 1C are intended to be illustrative only and embodiments of the disclosure are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and graph-based searching 96.

Conventionally, the collected data streams are correlated together by use of an index, and the index is generally able to accelerate the searching process for the collected data streams. However, it needs to consume a lot of computing resources and memory resources to build the index, and the searching in the data streams by use of the index always spends too much time. Moreover, since the search result is unpredicted, the traditional methods cannot be performed in a distributed environment.

In order to at least partially solve the above and other potential problems, a new approach for graph-based searching for one or more data streams is provided. According to embodiments of the present disclosure, the search speed for one or more data streams can be improved by use of the graph-based searching for the one or more data streams. That is, the correlation searching for the one or more data streams may be transformed into a traversing process in a graph.

Moreover, the edges in the graph may be reused during the traversing of the graph, which can reduce computing and memory consumption significantly. Since the nodes in the graph may be traversed individually, embodiments of the present disclosure can be implemented in a distributed environment, and the traversing actions at different nodes may be performed in parallel and asynchronously. Furthermore, embodiments of the present disclosure provide a detailed way to generate a graph for the data streams and traverse the graph, by which both the search speed and the search accuracy can be ensured.

Figure 2:
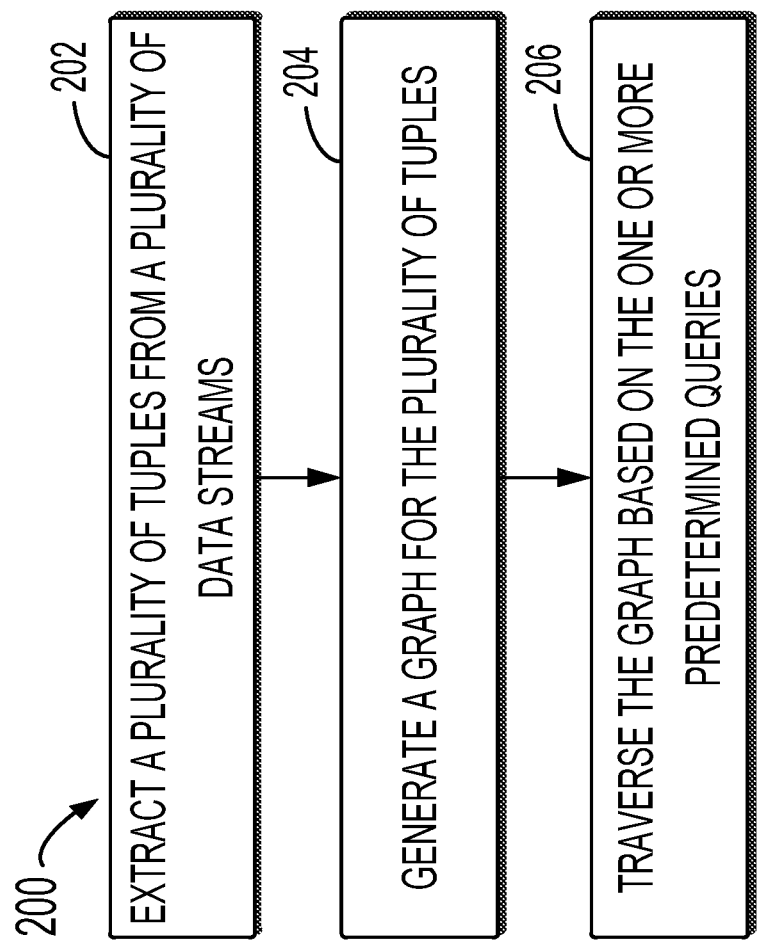
FIG. 2 is flowchart of a method for graph-based searching for one or more data streams in accordance with embodiments of the present disclosure.

Now some embodiments will be discussed. FIG. 2 is a flowchart of a method for graph-based searching for one or more data streams in accordance with embodiments of the present disclosure. It is to be understood that the method 200 may be performed by the processing unit 16 with reference to FIG. 1.

At 202, a plurality of tuples are extracted from one or more data streams. For example, the one or more data streams are collected in real time from a plurality of data sensors, and a tuple may be a portion of the data in a data stream. As used herein, the term "tuple" may represent a bit sequence or a text message such as a string. For example, the data stream may be a sequence of bits such as [ . . . 00110001 10110011 00110100 . . . ], and a tuple may be a part of the sequence, such as [10110100]. The data stream may include one or more fields, each represents a characteristic such as temperature. For example, the example tuple [10110100] may be divided into three data segments [101], [10], [100] according to a predefined rule, and data segment [101] may represent a value of a temperature field, data segment [10] may represent a value of a humidity field, and data segment [100] may represent a value of an AQI field. Some implementations of action 202 will be discussed below with reference to the following FIG. 3.

At 204, a graph for the plurality of tuples is generated. The graph generally includes at least two nodes and at least one edge between two nodes, and each node corresponds to each of the plurality of tuples, and thus the number of nodes in the graph is identical to the number of the tuples or the data streams. Each edge represents a correlation between two nodes, and each edge is generated based on a predetermined query. The predetermined query may include a correction query related to the one or more data streams, and the predetermined query may be used to retrieve the correlation among the plurality of tuples extracted from the one or more data streams. For example, if the predetermined query indicates that two nodes have a correlation search and the correlated values satisfy a predetermined correlation condition, the edge between the two nodes is generated. In this way, all the data correlations are combined into the edges in the graph. In some embodiments, the queries for predetermined types of data streams may be changeable during the runtime, and the generated graph may be updated based on the changed queries. For example, the constructed graph will be updated according to the latest queries during the runtime, and new tuples from the one or more data streams will be used to construct the updated graph for the subsequent traversing. Some implementations of action 204 will be discussed below with reference to the following FIGS. 4A-4B.

At 206, the graph is traversed based on the predetermined queries. Upon generating all the nodes and edges in the graph, the graph may be used to process the predetermined queries. For example, if two nodes have an edge associated with a specific query, the specific query may be enabled to traverse the edge in the graph. In this way, the corresponding search result may be generated directly without any searching of the index. Some implementations of action 206 will be discussed below with reference to the following FIGS. 5A-5D.

According to the method 200 of the present disclosure, the graph is constructed to take place of the index, and a query is performed by traversing one or more edges in the graph, and thus it reduces the time for the query significantly, thereby improving the search speed for one or more data streams. According to the method 200 of the present disclosure, the edge in the graph can directly represent a correlation between two tuples in data streams, and thus there is no need to search the index for the data streams. As such, the performance of the data correlation searching will be improved significantly in the case that depth of correlation searching increases because the searching time complexity according to embodiments of the present disclosure is constant for each data correlation.

Figure 3:
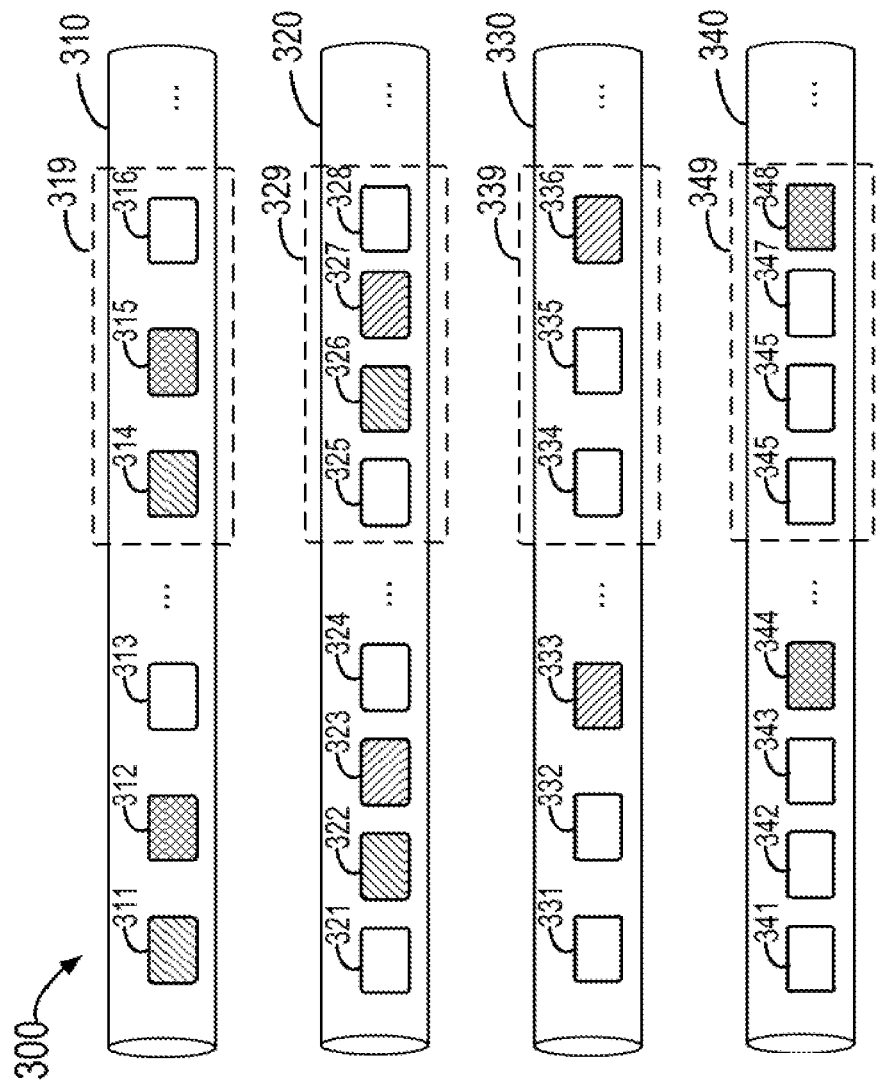
FIG. 3 is diagrams illustrating an example of a plurality of data streams in accordance with embodiments of the present disclosure.

FIG. 3 is a diagram 300 illustrating an example of a plurality of data streams in accordance with embodiments of the present disclosure. It will be understood that the example processes in FIG. 3 may be regarded as a specific implementation of action 202 in the method 200 with respect to FIG. 2.

As shown in FIG. 3, there are four data streams that are continuous collected from a plurality of sensors, for example data stream 310 (simply referred to as S1), data stream 320 (simply referred to as S2), data stream 330 (simply referred to as S3), and data stream 340 (simply referred to as S4). In some embodiments, some or all the data streams may be in a bit sequence format, and the meaning of each bit in the bit sequence may be predetermined. Alternatively, some or all of the data streams may be in a text format such as an Extensive Markup Language (XML) format, a Comma-Separated Values (CSV) format, or a JavaScript Object Notation (JSON) format. If not all the data streams are in the same format, some format conversion may be applied to some data streams in order to obtain a unified data format among the data streams.

As shown in FIG. 3, the data stream 310 at least includes data segments 311-316, the data stream 320 at least includes data segments 321-328, the data stream 330 at least includes data segments 331-336, and the data stream 340 at least includes data segments 341-348. Data in different data streams may be correlated through a field, as used herein, the term "field" represents a characteristic such as temperature. For example, the data stream 310 includes quite a lot of data segments such as data segments 311-316, but it merely contains three fields such as a temperature field, a humidity field and an AQI field. The data segment 311 and the data segment 314, which are two data segments, belong to a same field such as the temperature field, the data segment 312 and the data segment 315 belong to the humidity field, and the data segment 313 and the data segment 316 belong to the AQI field. That is, each filed may contain a plurality of data segments which represent a same characteristic.

As shown in FIG. 3, for example, the data segment 314 (simply referred to as S1.a) in the data stream 310 and the data segment 326 (simply referred to as S2.a) in the data stream 320 are associated with a first field (i.e., "a"), the data segment 327 (simply referred to as S2.b) in the data stream 320 and the data segment 336 (simply referred to as S3.b) in the data stream 330 are associated with a second field (i.e., "b"), and the data segment 315 (simply referred to as S1.c) in the data stream 310 and the data segment 348 (simply referred to as S4.c) in the data stream 320 are associated with a third field (i.e., "c").

In some embodiments, a predetermined time window may be applied to the one or more data streams so as to extract the plurality of tuples. For example, the predetermined time window may indicate the recent five seconds, and the tuple may represent the data segment(s) collected in the recent five seconds in the data stream. As shown in FIG. 3, by use of the predetermined time window, the tuple 319 which includes data segments 314-316 is extracted from the data stream 310, the tuple 329 which includes data segments 325-328 is extracted from the data stream 320, the tuple 339 which includes data segments 334-336 is extracted from the data stream 330, and the tuple 349 which includes data segments 345-348 is extracted from the data stream 340.

In some embodiments, one or more non-correlation queries are identified in the one or more predetermined queries, and each non-correlation query may represent a query associated with a single tuple in the plurality of tuples. That is, if a specific query merely involves a single tuple, for example, the value of the first field is above 3, this specific query may be performed directly without bringing into the graph. Then, the plurality of tuples may be updated based on the one or more non-correlation queries. In this way, the tuples are filtered preliminarily through the one or more non-correlation queries in order to improve the efficiency of the processing in the graph.

Figure 4A:
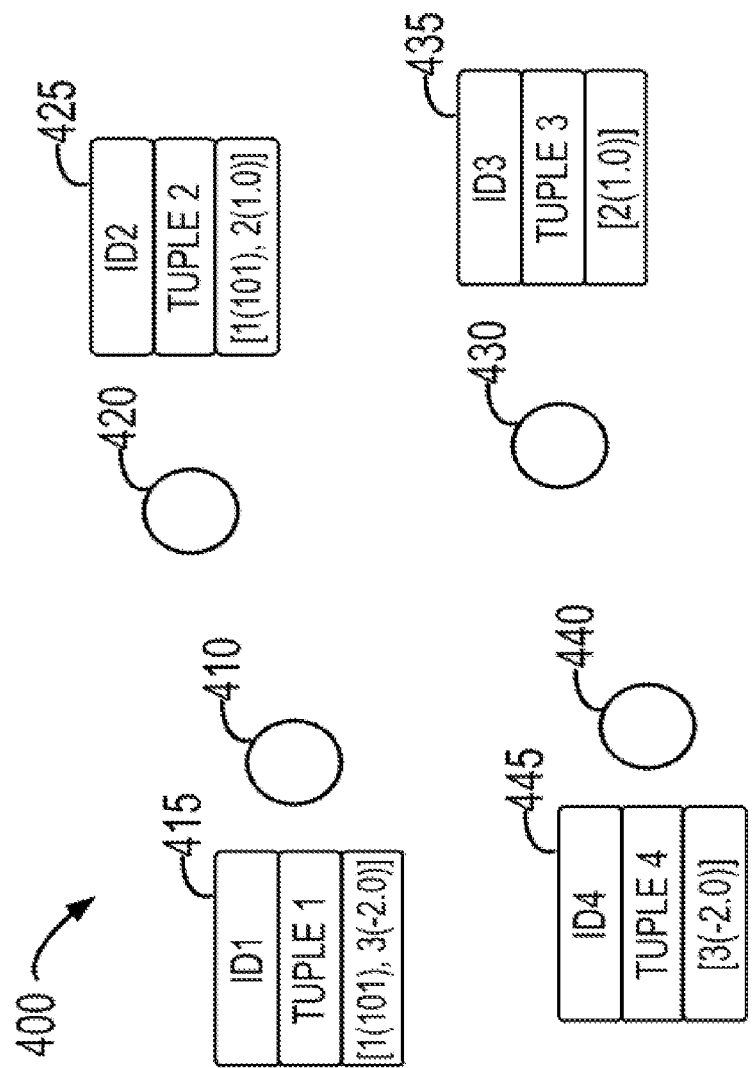
FIGS. 4A-4C are diagrams illustrating example processes for generating a graph for a plurality of data streams in accordance with embodiments of the present disclosure.
Figure 4B:
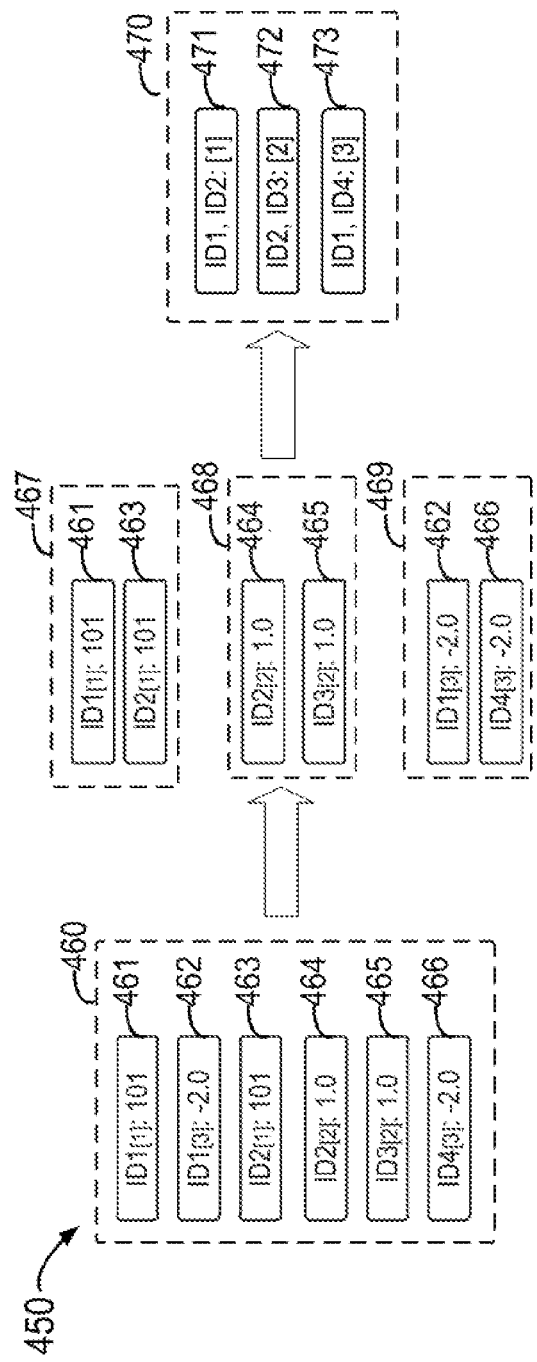
Figure 4C:
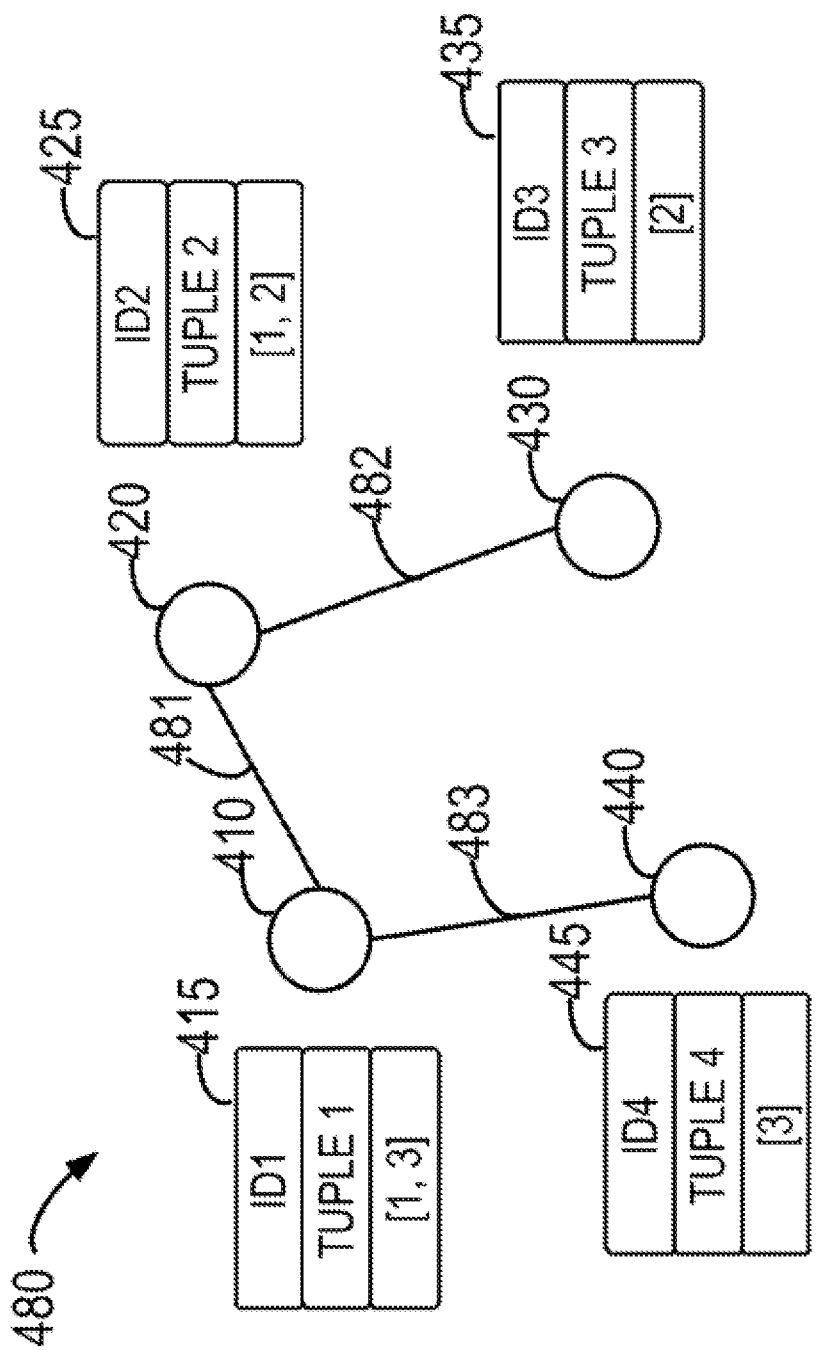

FIGS. 4A-4C are diagrams illustrating example processes for generating a graph for a plurality of data streams in accordance with embodiments of the present disclosure. It will be understood that the example processes in FIGS. 4A-4C may be regarded as a specific implementation of action 204 in the method 200 with respect to FIG. 2, and the data streams may be data streams 310, 320, 330 and 340 with respect to FIG. 3.

FIG. 4A is a diagram 400 illustrating an example process for determining nodes and the attributes of the nodes in accordance with embodiments of the present disclosure. For example, upon extracting the plurality of tuples 319, 329, 339 and 349, a plurality of nodes may be generated in the graph, and each node correspond to one tuple. As shown in FIG. 4A, the node 410 may correspond to the tuple 319, the node 420 may correspond to the tuple 329, the node 430 may correspond to the tuple 339, and the node 440 may correspond to the tuple 349.

Next, the attributes of each node may be generated, which may include an identification of the node, the content of the tuple, and an index of a predetermined query of one or more predetermined queries which is associated with the tuple. According to embodiments of FIGS. 4A-4C, the one or more predetermined queries may be for example shown in table 1.

TABLE 1 example predetermined queries

| Index | Predetermined queries |
|---|---|
| 1 | S1.a = S2.a |
| 2 | S2.b = S3.b |
| 3 | S1.c = S4.c |

As shown in table 1, the predetermined query with an index "1" relates to the field "a" of data streams S1 and S2, the predetermined query with an index "2" relates to the field "b" of data streams S2 and S3, and the predetermined query with an index "c" relates to the field "c" of data streams S1 and S4. That is, one predetermined query may involve one field related to two data streams. It should be understood, although the queries in table 1 merely illustrates the equality relationship, other mathematics relationships and mathematics functions may be also possible, for example, S1.a>S2.a, or abs(S1.a-S2.a)>3.0, as further discussed below.

For example, the set of attributes 415 of the node 410 is generated, which include the identification "ID1" that can be generated or extracted from the tuple, the content of the tuple 319, denoted as "TUPLE 1" which include the data segments 314-316. Moreover, the set of attributes 415 may further include the index of the predetermined queries such as "1, 3", because the tuple 319 (that is S1) is associated with the predetermined queries with indexes "1" and "3", as shown in Table 1. As shown, the set of attributes 415 may also include a value of a field corresponding to an index, for example, the value of the field "a" corresponding to the index "1" is 101, and the value of the field "c" corresponding to the index "3" is −2.0. In some embodiments, the set of attributes 415 may further include a search result that is used to store the temporarily generated result. In this way, the set of attributes 425 of the node 420, the set of attributes 435 of the node 430, and the set of attributes 445 of the node 440 may also be generated, as shown in FIG. 4A.

FIG. 4B is a diagram 450 illustrating an example process for correlating nodes in the graph in accordance with embodiments of the present disclosure. As shown in 450, fields of all the tuples associated with the predetermined queries are identified, and values of these fields are extracted from the tuples. For example, as shown in the dotted box 460, values 461-466 are extracted based on the predetermined queries in the above Table 1.

Some groups 467-469 are then generated based on the values 461-466, and each group satisfies a correlation condition for a predetermined query. The correlation condition may be determined based on whether two tuples meet a constraint in a predetermined query. As an example, the correlation condition may be defined as S1.a=S2.a, which means that a value of a field "a" of a tuple from the data stream S1 is equal to that of the field "a" of a tuple from the data stream S2. As another example, the correlation condition may be defined as S1.a>S2.a or S1.a<S2.a, which means that the value of the field "a" of a tuple from the data stream S1 is greater or less than that of the field "a" of a tuple from the data stream S2. In some embodiments, the correlation condition may be defined as a function of a predetermined query, such as abs(S1.a-S2.a)>3.0, which means that the absolute value of the difference between S1.a and S2.a is greater than 3.0. That is, if abs(S1.a-S2.a)>3.0, the correlation condition is satisfied, and a group may be generated accordingly.

For example, in the case of the example predetermined queries in table 1, the value "101" of the first field "a" are grouped together in the group 467, the value "1.0" of the second field "b" are grouped together in the group 468, and the value "−2.0" of the third field "c" are grouped together in the group 469. Next, each group is transformed to an entry for an edge. For example, as shown in the dotted box 470, the group 467 is transformed to the entry 471 which indicates the node 410 and the node 420 have an edge associated with the first field, the group 468 is transformed to the entry 472 which indicates the node 420 and the node 430 have an edge associated with the second field, and the group 469 is transformed to the entry 473 which indicates the node 410 and the node 440 have an edge associated with the third field.

FIG. 4C is a diagram 480 illustrating an example process for generating edges in the graph in accordance with embodiments of the present disclosure. As shown in FIG. 4C, since the entry 471 indicates the node 410 and the node 420 have an edge associated with the first field, edge 481 associated with the first field is generated between the node 410 and the node 420. Similarly, edge 482 associated with the second field is generated between the node 420 and the node 430, and edge 483 associated with the third field is generated between the node 410 and the node 440.

FIGS. 5A-5D are diagrams illustrating example processes for traversing the graph based on predetermined queries in accordance with embodiments of the present disclosure. It will be understood that the example processes in FIGS. 5A-5D may be regarded as a specific implementation of action 206 in the method 200 with respect to FIG. 2, and the graphs 500, 530, 560 and 590 may be the graph 480 with respect to FIG. 4C.

Figure 5A:
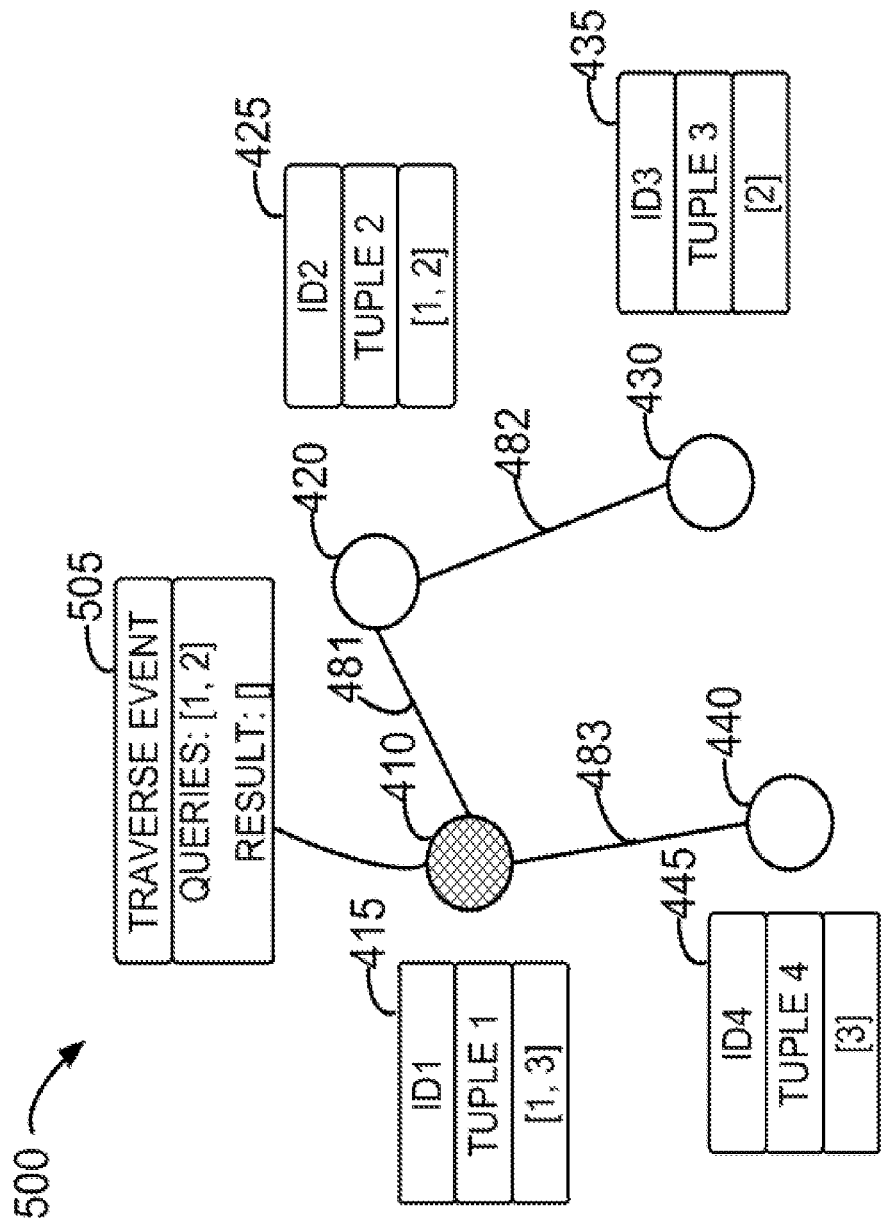
FIGS. 5A-5D are diagrams illustrating example processes for traversing the graph generated FIGS. 4A-4C based on predetermined queries in accordance with embodiments of the present disclosure.

FIG. 5A is a diagram 500 illustrating an example process for determining a start node in accordance with embodiments of the present disclosure. For example, a traverse event 505 is generated and broadcasted to all nodes in the graph. As shown in FIG. 500, the traverse event 505 is related to the queries with indexes "1" and "2" in the Table 1, that is S1.a=S2.a and S2.b=S3.b. Since the first query S1.a=S2.a first involves "S1," the node 410 corresponding to the TUPLE 1 in the data stream "S1" is determined as the start node that is traversed first. Thus, the node 410 will accept the traverse event 505 instead of nodes 420, 430 and 440. Alternatively, the queries may be prepossessed and the node 410 may be identified as the start node, and the traverse event 505 will only be transferred to the node 410. As shown in FIG. 5A, the traverse event 505 may include an entry of result that is used to store temporary traversing result. In some embodiments, if one or more queries in the traverse event 505 are not found, the traverse event 505 may be terminated, and no data stream will be output.

Figure 5B:
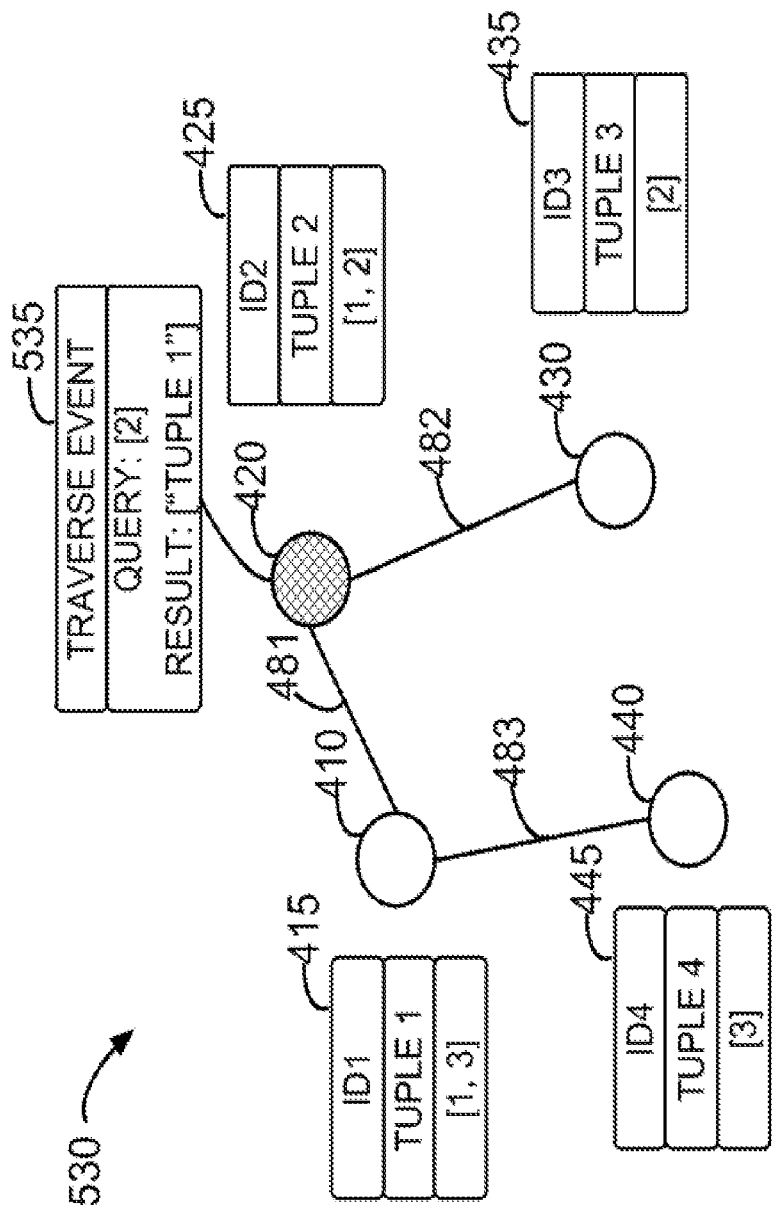
Figure 5C:
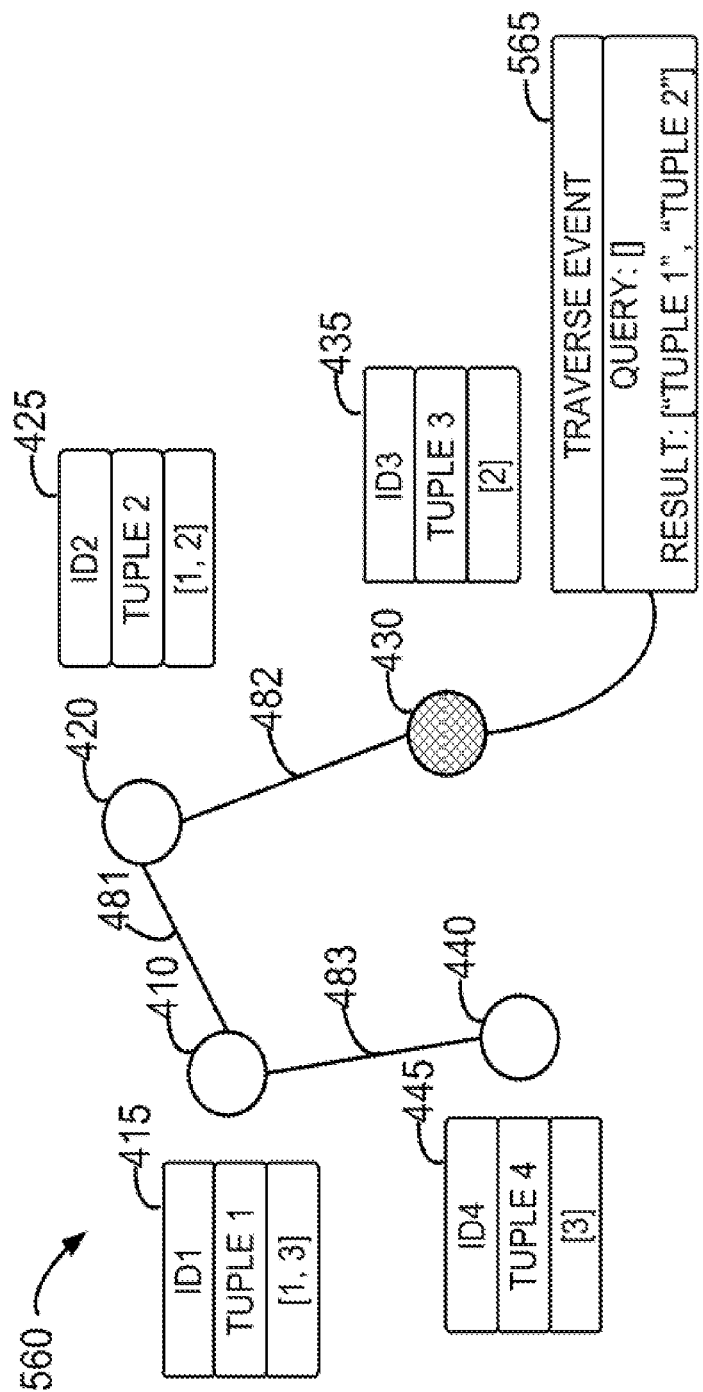
Figure 5D:
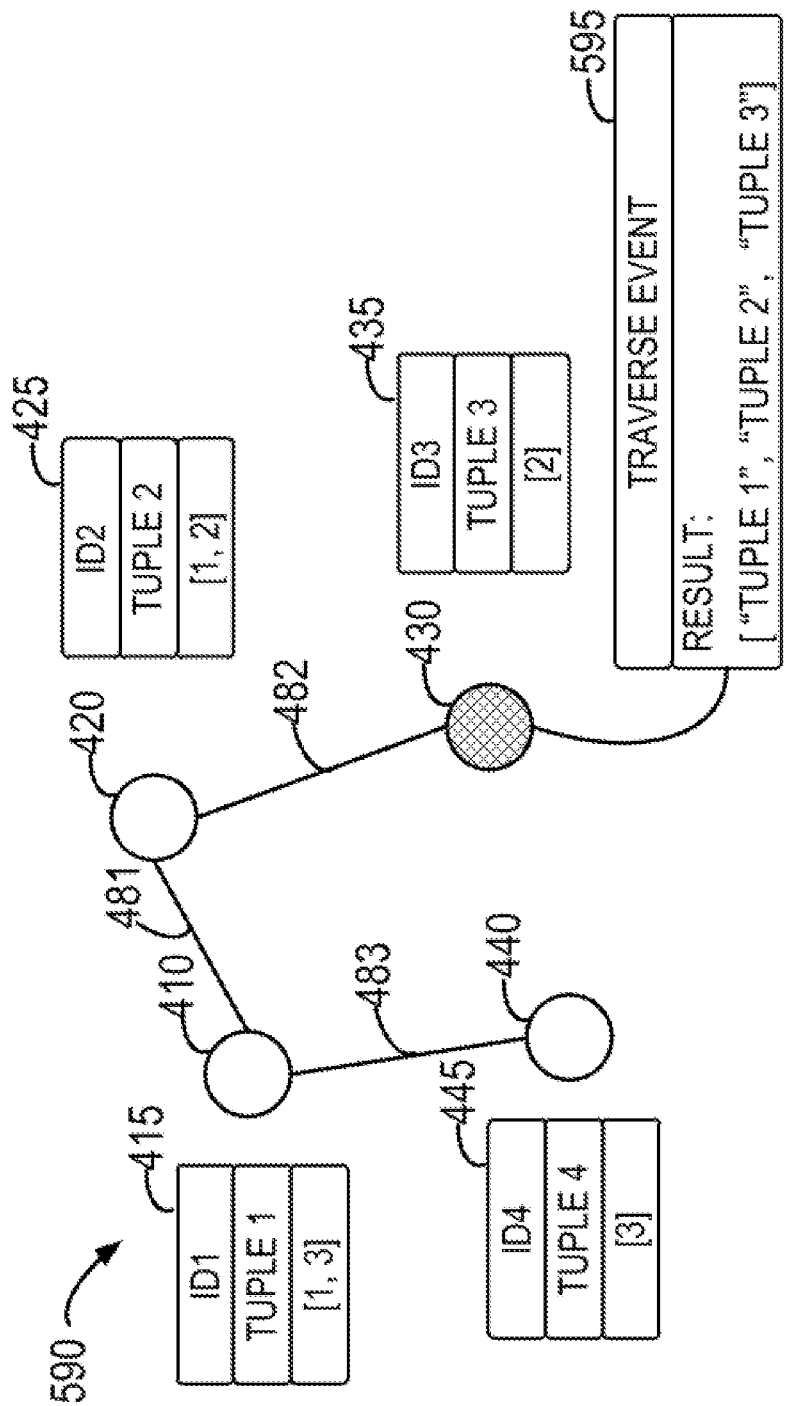

FIG. 5B is a diagram 530 illustrating an example process for transferring the traverse event between nodes in accordance with embodiments of the present disclosure. Since the first query S1.a=S2.a involves the edge 481, and the traverse event is transferred from the node 410 to the node 420. Then, the traverse event 505 is updated to a traverse event 535 at the node 420, in which the first query that has been traversed is deleted from the set of queries, and TUPLE 1 of the node 410 that has been traversed is added into the query result.

Next, it is determined whether the updated set of queries is empty. As shown in diagram 530 of FIG. 5B the query in the traverse event 535 is not empty, and thus the process for transferring the traverse event between nodes continues. Since the second query S2.b=S3.b involves the edge 482, and the traverse event is directly transferred from the node 420 to the node 430. Then, as shown in diagram 560 of FIG. 5C, the traverse event 535 is updated to a traverse event 565 at the node 430, in which the second query that has been traversed is deleted from the set of queries, and TUPLE 2 of the node 420 that has been traversed is added into the query result.

Next, it is determined whether the updated set of queries is empty. Since the set of query in the traverse event 565 is empty, the query result in the traverse event is updated to add the TUPLE 3 of the node 430, and the updated query result may be output. As shown in diagram 590 of FIG. 5D, the traverse event 565 is finally updated to traverse event 595, in which the search result is ["TUPLE 1", "TUPLE 2", "TUPLE 3"]. At this point, the traverse event is done and the outputted search result is ["TUPLE 1", "TUPLE 2", "TUPLE 3"].

In some embodiments, if the same query is performed repeatedly, the edges in the graph may be reused during the traversing for the graph, which can reduce computing and memory consumption significantly. According to embodiments of the present disclosure, the nodes in the graph may be traversed individually, and thus another search event with the query S1.c=S4.c may be performed in parallel and asynchronously at the local computing device or a remote device. That is, the traversing for the graph according to embodiments of the present disclosure may be implemented in a distributed environment, thereby improving parallel processing capability. Accordingly, embodiments of the present disclosure can improve the search speed for one or more data streams by use of the graph-based searching for the one or more data streams.

The present disclosure may be a system, an apparatus, a device, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   extracting a plurality of tuples from one or more data streams;
   generating a graph for the plurality of tuples in which a node represents a tuple of the plurality of tuples and an edge represents a correlation between the node and another node, the edge being generated based at least partly on one or more predetermined queries for the one or more data streams; and
   traversing the graph based on the one or more predetermined queries:
   wherein the traversing the graph comprises:
   determining a first node in the plurality of nodes which is traversed first; and
   transferring a traverse event from the first node to a second node based on the set of queries;
   updating a set of queries and a query result in the traverse event;
   determining whether the updated set of queries is empty;
   in response to determining that the updated set of queries is empty, updating the query result in the traverse event; and
   outputting the updated query result.

2. The method of claim 1, wherein the generating the graph comprises:
   generating a plurality of attributes of the node, the plurality of attributes including an identification, content of the tuple, and an index of at least one predetermined query of the one or more predetermined queries which is associated with the tuple.

3. The method of claim 2, wherein the generating the graph further comprises:
   identifying a field of the tuple, the field of the tuple being associated with the predetermined query;
   extracting a value of the field from the tuple; and
   generating the edge between the node and the other node based at least partly on the value of the field.

4. The method of claim 3, wherein the generating the edge between the node and the other node comprises:
   generating one or more groups based on a value of each of one or more fields associated with the one or more predetermined queries, one of the one or more groups satisfying a correlation condition for one of the one or more predetermined queries; and
   generating the edge between the node and the other node based on the one or more groups.

5. The method of claim 1, wherein the extracting a plurality of tuples from one or more data streams further comprises:
   identifying a non-correlation query in the one or more predetermined queries, the non-correlation query representing a query associated with a single tuple in the plurality of tuples;
   performing the non-correlation query on the plurality of tuples; and
   updating the plurality of tuples based on the performing of the non-correlation query.

* * * * *